Sept. 29, 1931.  D. D. KOHLER  1,825,356
POWER ATTACHMENT FOR ICE CREAM FREEZERS
Filed Sept. 24, 1930  2 Sheets-Sheet 1

Inventor
Donald D. Kohler

By Clarence A. O'Brien
Attorney

Sept. 29, 1931.  D. D. KOHLER  1,825,356
POWER ATTACHMENT FOR ICE CREAM FREEZERS
Filed Sept. 24, 1930  2 Sheets-Sheet 2
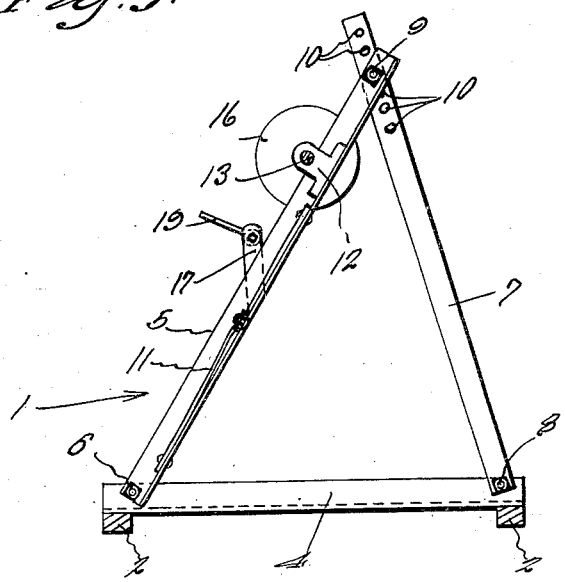
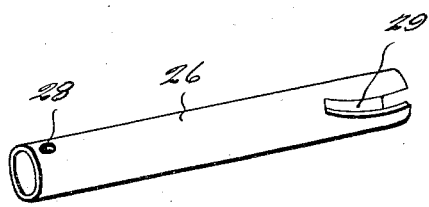
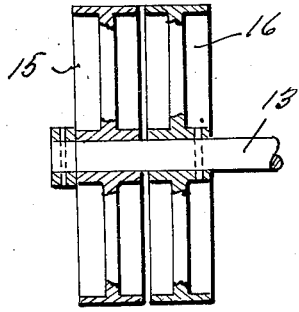
Inventor
Donald D. Kohler
By Clarence A. O'Brien
Attorney Patented Sept. 29, 1931

1,825,356

UNITED STATES PATENT OFFICE

DONALD DAVID KOHLER, OF AMSTERDAM, OHIO

POWER ATTACHMENT FOR ICE CREAM FREEZERS

Application filed September 24, 1930. Serial No. 484,198.

This invention relates to an attachment for ice cream freezers and more particularly to means for operatively connecting an ice cream freezer of the conventional hand driven type to a suitable source of power such as an internal combustion engine for actuating the freezer.

An important object of the invention is to provide, in a manner as hereinafter set forth, a power attachment for ice cream freezers which includes adjustable means whereby said attachment may be used for operating freezers of various sizes.

Other objects of the invention are to provide power attachment for ice cream freezers of the character described which will be simple in construction, strong, durable, efficient in operation and which may be manufactured at low cost.

All of the foregoing and still further objects and advantages of the invention may become apparent from a study of the following specification, taken in connection with the accompanying drawings wherein like characters of reference designate corresponding parts throughout the several views, and wherein :—

Figure 3 is a vertical sectional view taken substantially on the line 3—3 of Figure 1.

Figure 4 is a detail perspective view of the coupling which connects the operating shaft of the ice cream freezer to the drive shaft of the attachment.

Figure 5 is a detail view in section taken substantially on the line 5—5 of Figure 1.

Figure 1:
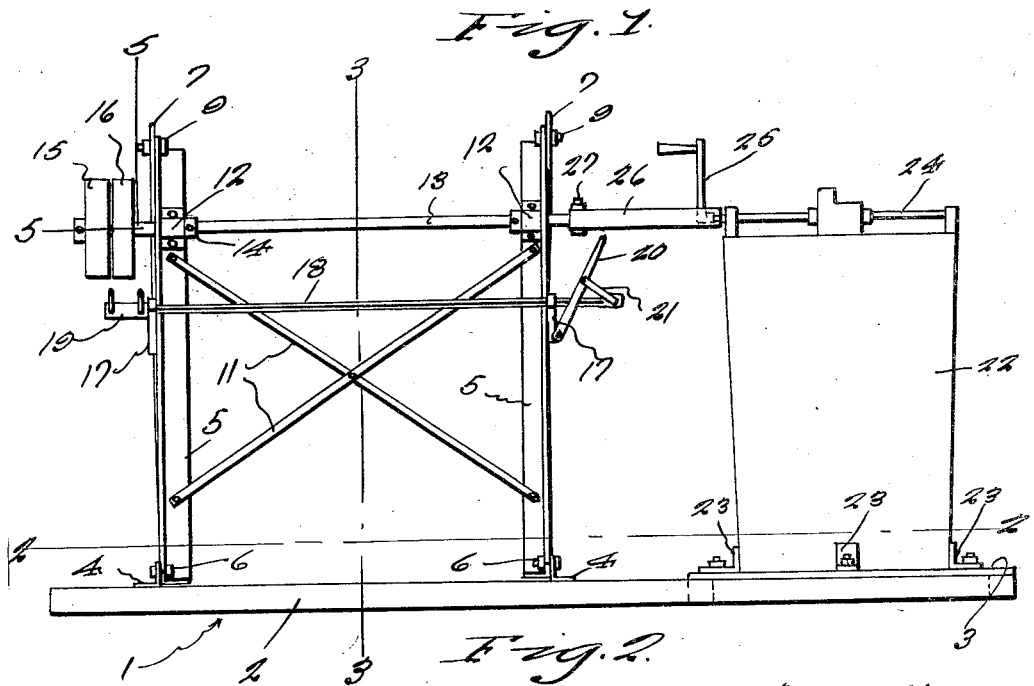
Figure 1 is a view in front elevation of an attachment for ice cream freezers constructed in accordance with this invention showing the same operatively connected with a freezer.
Figure 2:
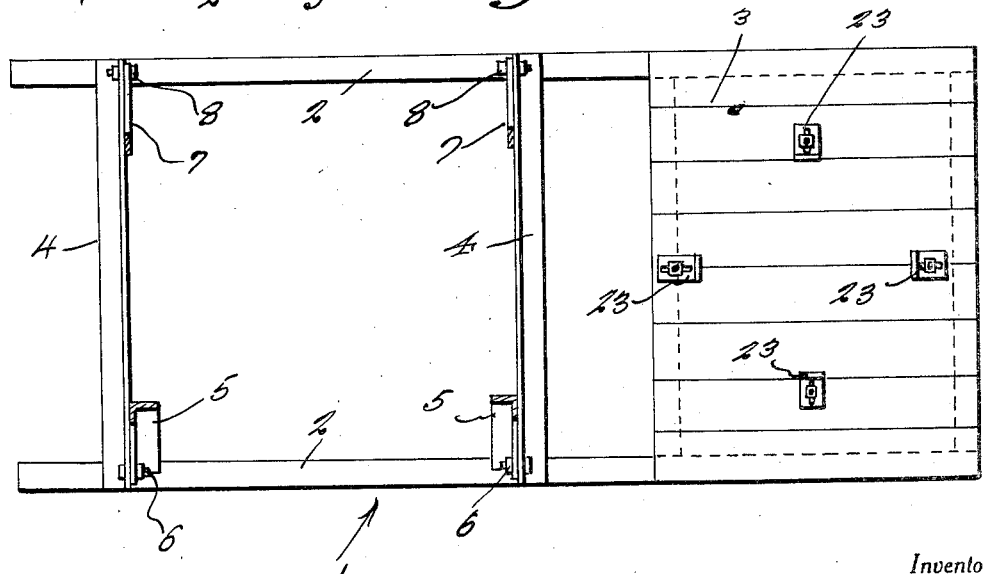
Figure 2 is a horizontal sectional view taken substantially on the line 2—2 of Figure 1 with the freezer removed.

Referring to the drawings in detail, it will be seen that the device constituting this invention includes a supporting structure which is designated generally by the reference numeral 1 and said supporting structure comprises a pair of spaced, parallel co-extensive beams 2 upon one end portion of which is mounted a platform 3. Cross bars of angle iron 4 extend between the beams 2 at spaced points on said beams.

The supporting structure further includes the rearwardly inclined legs 5 which have their lower end portions pivotally connected to one end portion of the cross bars 4 by the bolts 6. Braces 7 are pivotally connected by bolts 8 to the other end portions of the cross bars 4 and said braces are adjustably connected, at their upper ends to the upper end portions of the legs 5 through the medium of the bolts 9 extending through the legs 5 and adapted to selective insertion through the spaced holes 10 in the upper end portions of the braces 7. As best seen in Figure 1 of the drawings crossed braces 11 extend between the legs 5. Mounted on the outer side of each of the legs 5 is a bearing 12, said bearings 12 being aligned with each other. A horizontally disposed shaft 13 is journaled in the bearings 12 and is prevented from moving longitudinally in the bearings by collars 14 which are fixed on the shaft. The shaft 13 extends beyond each of the legs 5 and mounted on one end portion of said shaft 13 is a loose pulley 15 and a tight pulley 16. As will be apparent, the pulleys 15 and 16 are adapted to have trained thereover an endless drive belt (not shown) from a suitable source of power, such as an engine, also not shown.

Upstanding brackets 17 are mounted on the legs 5 below the bearings 12 and slidably mounted in the brackets is a rod 18 of polygonal cross section. The openings in the brackets 17 through which the rod 18 extends are also polygonal to prevent rotation of the rod in the brackets. One end of the rod 18 has mounted a shifter 19 for shifting the belt from one of the pulleys to the other when it is so desired. The other end of the rod 18 is operatively connected to a hand lever 20 which is pivotally mounted on the adjacent legs 5 by a link 21.

An ice cream freezer of conventional construction is mounted on the platform 3 and designated by the reference character 22. Retaining brackets 23 are adjustably mounted on the platform 3 for engagement with the lower end portion of the freezer 22 for retaining said freezer in position on the platform. The brackets 23 are adapted to be adjusted toward or away from each other to accommodate freezers of different diameters. The freezer 22 includes the usual operating shaft 24 on its upper end to which the hand crank 25 is secured at one end. A tubular coupling 26 is slipped over the end portion of the shaft 13 which is remote from the pulleys 15 and 16 and secured to said shaft 13 by the transverse pin 27. As best seen in Figure 4 of the drawings, the tubular coupling 26 is provided, in the end portion which is engaged over the shaft 13, with an opening in each side, 28, for the passage of the pin 27. The opposite end portion of the tubular coupling 26 is slipped over the end portion of the operating shaft 24 of the freezer 22 upon which the crank 25 is fixed and said opposite end portion is provided with an arcuate slot 29 for the reception of the crank 25. In this manner the crank 26 serves to key the coupling 26 to the shaft 24 of the freezer.

In operation, as will be obvious, when the shaft 13 is rotated, rotation will be imparted to the operating shaft 24 of the freezer 22 through the medium of the tubular coupling 26. Should it be deemed desired to stop operation of the freezer 22 without stopping the engine which drives the shaft 13, this may be accomplished by simply shifting the drive belt from the tight pulley 16 to the loose pulley 15 through the medium of the shifter 19 which, as hereinbefore explained is manually actuated through the medium of the hand lever 20, the link 21 and the polygonal rod 18. The device is adapted for use in operating freezers of different heights by removing the bolts 9 and swinging the legs 5 in either direction in a manner to raise or lower the shaft 13. The bolts 9 are then inserted through the desired holes 10 in the braces 7. The retaining brackets 23 will permit the freezer 22 to be positioned on the platform 3 so that the operating shaft 24 will at all times be in alignment with the drive shaft 13.

What is claimed is:—

1. A power attachment for ice cream freezers of the character described comprising a supporting structure including a base, a pair of legs hingedly mounted on the base for swinging adjustment in a vertical plane, braces hingedly mounted on the base for vertical swinging movement and adjustably connected to the legs for retaining said legs in adjusted position, a horizontal shaft rotatably supported on the legs, a platform for supporting the freezer adjacent one end of the shaft, a coupling operatively connecting the freezer to the shaft, and means on the other end of the shaft for connecting said shaft with a source of power.

2. A power attachment for ice cream freezers of the character described comprising a supporting structure including a pair of spaced, parallel, co-extensive beams, a platform mounted on one end portion of the beams, cross bars extending between the beams at spaced points on said beams, a pair of legs pivotally connected, at one end, to one end portion of the cross bars, and extending outwardly at an inclination therefrom for swinging adjustment in a vertical plane, braces pivotally connected, at one end, to the other end portions of the cross bars, and extending upwardly therefrom at an inclination and having a series of spaced holes in their upper end portions, means adjustably connecting the braces to the legs in a manner to support said legs in adjusted position, a horizontal shaft rotatably supported on the legs and extending outwardly from said legs, means on the platform for engagement with the freezer in a manner to retain the freezer in alignment with the shaft, means for operatively connecting the freezer to the shaft for actuation thereby.

3. A power attachment for ice cream freezers of the character described comprising a supporting structure including a pair of spaced, parallel, co-extensive beams, a platform mounted on one end portion of the beams, cross bars extending between the beams at spaced points on said beams, a pair of legs pivotally connected, at one end, to one end portion of the cross bars, and extending outwardly at an inclination therefrom for swinging adjustment in a vertical plane, braces pivotally connected, at one end, to the other end portions of the cross bars, and extending upwardly therefrom at an inclination and having a series of spaced holes in their upper end portions, means adjustably connecting the braces to the legs in a manner to support said legs in adjusted position, a horizontal shaft rotatably supported on the legs and extending outwardly from said legs, means on the platform for engagement with the freezer in a manner to retain the freezer in alignment with the shaft, means for operatively connecting the freezer to the shaft for actuation thereby, said means comprising a tubular coupling rigidly connected at one end portion of the shaft, said coupling being adapted for engagement telescopically over one end portion of the operating shaft of the freezer and having an arcuate slot in said one end portion for the passage of the actuating crank of the freezer in a manner to lock the coupling to the freezer shaft against relative rotary movement with respect to said freezer shaft.

In testimony whereof I affix my signature.

DONALD DAVID KOHLER.